US011323476B1

(12) United States Patent
Cao et al.

(10) Patent No.: US 11,323,476 B1
(45) Date of Patent: May 3, 2022

(54) PREVENTION OF CREDENTIAL PHISHING BASED UPON LOGIN BEHAVIOR ANALYSIS

(71) Applicant: Trend Micro Inc., Tokyo (JP)

(72) Inventors: Jing Cao, Nanjing (CN); Quan Yuan, Nanjing (CN); Bo Liu, Nanjing (CN)

(73) Assignee: TREND MICRO INC., Tokyo (JP)

( * ) Notice: Subject to any disclaimer, the term of this patent is extended or adjusted under 35 U.S.C. 154(b) by 370 days.

(21) Appl. No.: 16/692,680

(22) Filed: Nov. 22, 2019

(51) Int. Cl.
*G06F 15/16* (2006.01)
*H04L 29/06* (2006.01)
*G06F 16/954* (2019.01)
*G06F 11/32* (2006.01)

(52) U.S. Cl.
CPC ........ *H04L 63/1483* (2013.01); *G06F 11/327* (2013.01); *G06F 16/954* (2019.01)

(58) Field of Classification Search
CPC .................................................. H04L 63/1483
See application file for complete search history.

(56) References Cited

U.S. PATENT DOCUMENTS

| | | | | |
|---|---|---|---|---|
| 8,453,222 B1 * | 5/2013 | Newstadt | .............. | H04L 63/083 726/4 |
| 10,592,983 B1 * | 3/2020 | Yamashita | ........... | G06Q 40/025 |
| 2012/0084844 A1 * | 4/2012 | Brown | .................... | G06F 21/34 726/6 |
| 2014/0189808 A1 * | 7/2014 | Mahaffey | ............ | H04L 63/0853 726/4 |
| 2016/0234245 A1 * | 8/2016 | Chapman | ............ | G06F 21/6245 |
| 2017/0078321 A1 * | 3/2017 | Maylor | ............... | H04L 63/1433 |
| 2017/0180378 A1 * | 6/2017 | Tyler | .................. | H04L 63/0254 |
| 2017/0186106 A1 * | 6/2017 | Soboil | ................ | G06F 21/6245 |
| 2021/0365980 A1 * | 11/2021 | Hain | ............... | H04N 21/44204 |

\* cited by examiner

*Primary Examiner* — Hieu T Hoang
(74) *Attorney, Agent, or Firm* — Beyer Law Group LLP

(57) ABSTRACT

A system is implemented in browser plug-in software or in endpoint agent software on a user computer. The user accesses a Web site and fills in a login request form and submits it to the Web site. The system triggers a "forgot password" feature and detects a phishing Web site by determining that it does not send a reset link to a valid user e-mail address, or, the system detects a phishing Web site by determining that it does send a reset link to an invalid e-mail address. Or, the system detects a phishing Web site by determining that it sends a reset link to a user e-mail address from a domain different from the domain of a login request form. Or, the system fills in an incorrect account name or password in a login request form and detects a phishing Web site by determining that the Web site does not indicate that the incorrect user name or incorrect password are incorrect. Or, the system submits incorrect credentials and detects a phishing Web site by determining that the Web site does not implement any way to reset the account name or password.

18 Claims, 10 Drawing Sheets

System Overview

*Login Process*

System Overview

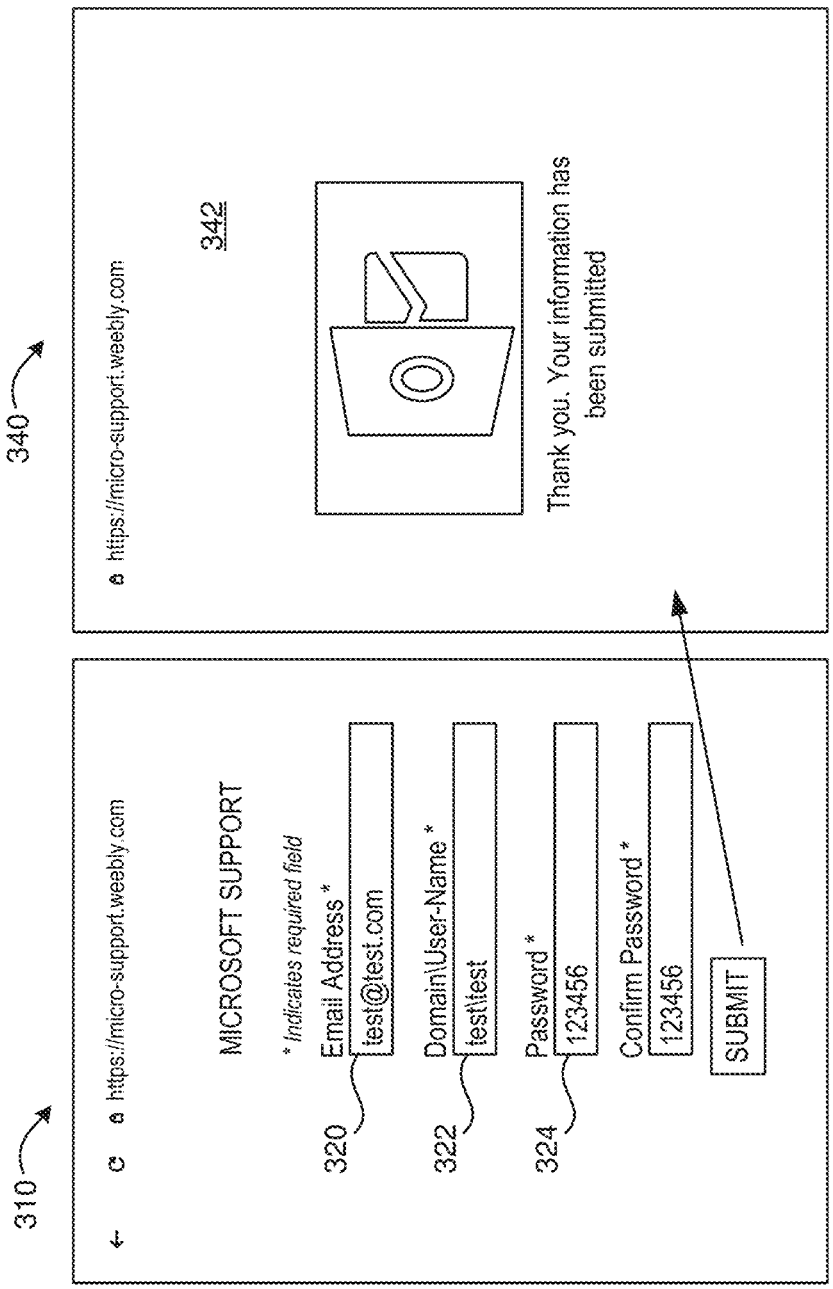

System Overview

*Prevent Credential Phishing*

*Reset Password Message*

*Pop-up Window*

*Input E-Mail Address*

*Input Whether Reset Password Message Received*

PREVENTION OF CREDENTIAL PHISHING BASED UPON LOGIN BEHAVIOR ANALYSIS

FIELD OF THE INVENTION

The present invention relates generally to preventing sensitive user information from being taken from a user while online. More specifically, the present invention relates to detection and prevention of credential phishing by a malicious Web site.

BACKGROUND OF THE INVENTION

When a user of a computer is accessing information online it is important to protect the user's sensitive information in order to avoid loss or theft of that information, to prevent access to other private information protected by the user's sensitive information, and to prevent any financial loss from the theft of the user's sensitive information.

One type of malicious attack is known as credential phishing, which is an attempt to steal a user credentials. Attackers usually trick users into giving up their login information voluntarily, through a phony or compromised login page of a legitimate Web site. The most notorious credential phishing attack was the attack on John Podesta's account, the chairman of the Hillary Clinton presidential campaign during the 2016 election. Prevention of such credential phishing attacks, therefore, is paramount for many individuals, corporations and other groups. Unfortunately, the look and feel of a phishing login page is nearly identical to the authentic one. For non-professionals, i.e., for most users, it is easy for them to be deceived.

The existing technologies in today's market for combating credential phishing include: list-based techniques (whitelisting the authentic site and blacklisting the phony Web site); content-based techniques (analyzing the layout and the content of a Web page); and image-based techniques (analyzing the favorite icon or favicon of the Web site, performing OCR on a Web page and identifying key elements on the page using computer vision technology, etc.).

Unfortunately, each of these techniques has unique challenges that prevent each technique from being truly successful. For example, the list-based approach is efficient but inherently the quality is not good in view of the uncountable number of Web sites. The content-based approach fails when noise is added into a Web page (e.g., inserting a useless or hidden HTML element or using an image and text mixture to construct meaningful sentences). And, the image-based approach needs to store the raw information from authentic login pages in a database (i.e., the visual layout and captured images). For Web sites that are absent from the database, this approach cannot effectively determine the phony Web sites.

Accordingly, a more effective way to prevent credential phishing is desired.

SUMMARY OF THE INVENTION

To achieve the foregoing, and in accordance with the purpose of the present invention, a system is disclosed that detects via login behavior if a Web site with which a user is interacting is a phishing site.

In a first embodiment, a system executing on a user computer detects a phishing Web site by determining that it does not send a reset link to a user e-mail address. A first step receives a Web page from a Web site over a network connection indicating that either an account name or a password of a login request form that has been received from said user computer is incorrect. The Web page includes a reset link to reset the account or the password. Using the reset link, the system sends a valid e-mail address of the user to the Web site. After sending, the user checks his or her e-mail account and then the system receives an input from the user indicating that no message to reset the account name or the password has been received at the user's e-mail address. If so, then the system alerts the user that the Web site is a phishing Web site.

In a second embodiment, a system executing on a user computer detects a phishing Web site by determining that it does send a reset link to an invalid e-mail address. A first step receives a Web page from a Web site over a network connection indicating that either an account name or a password of a login request form that has been received from said user computer is incorrect. The Web page includes a reset link to reset the account or the password. Using the reset link, the system sends an invalid e-mail address of the user to the Web site. After sending, the system determines that a message to reset the account name or the password has been received at the invalid e-mail address. If so, then the system alerts the user that the Web site is a phishing Web site.

In a third embodiment, a system executing on a user computer detects a phishing Web site by determining that it send a reset link to a user e-mail address from a domain different from the domain of a login request form. A first step receives a Web page from a Web site over a network connection indicating that either an account name or a password of a login request form that has been received from said user computer is incorrect. The Web page includes a link to input an e-mail address in order to reset the account or the password. Using the link, the system sends a valid e-mail address of the user to the Web site. After sending, the user checks his or her e-mail account and then the system receives an input from the user which includes a reset link or the page accessed via the reset link. If the reset link in the reset message received by the user includes a domain that does not match a domain of the login request form then the system alerts the user that the Web site is a phishing Web site.

In a fourth embodiment, a system executing on a user computer detects a phishing Web site by determining that the Web site does not indicate that an incorrect user name or incorrect password are incorrect. In a first step, the system receives a login request form from a browser of the user computer which includes an account name and a password that is destined for the Web site. The system replaces the account name or the password of the login request from with either a respective incorrect account name or an incorrect password. Next, it sends the modified login request form from the user computer to the Web site over a network connection. In response to that sending, the system receives a Web page from the Web site and determines that the Web page does not indicate that the incorrect account name or the incorrect password are, in fact, incorrect. Thus, it alerts a user of the user computer that the Web site is a phishing Web site.

In a fifth embodiment, a system executing on a user computer detects a phishing Web site by determining that the Web site does not implement any way to reset the account name or password. In a first step, the system receives a login request form from a browser of the user computer which includes an account name and a password that is destined for the Web site. The system sends the login request form from the user computer to the Web site over a network connection. In response to that sending, the system receives a Web page from the Web site and determines that the Web page does indicate that either the account name or the password is incorrect. The system then determines that the returned Web page does not implement any mechanism to reset the account name or the password. Thus, it alerts a user of the user computer that the Web site is a phishing Web site.

BRIEF DESCRIPTION OF THE DRAWINGS

The invention, together with further advantages thereof, may best be understood by reference to the following description taken in conjunction with the accompanying drawings in which:

FIGS. 3A and 3B are an example of a phishing Web site that only collect credentials.

DETAILED DESCRIPTION OF THE INVENTION

The inventors have realized that illegitimate or phony Web sites have no knowledge of certain user information, such as an e-mail address to be used if a password if forgotten. Therefore, this invention addresses credential phishing in a different way than the prior art, based upon login behavior analysis (LBA).

Figure 1:
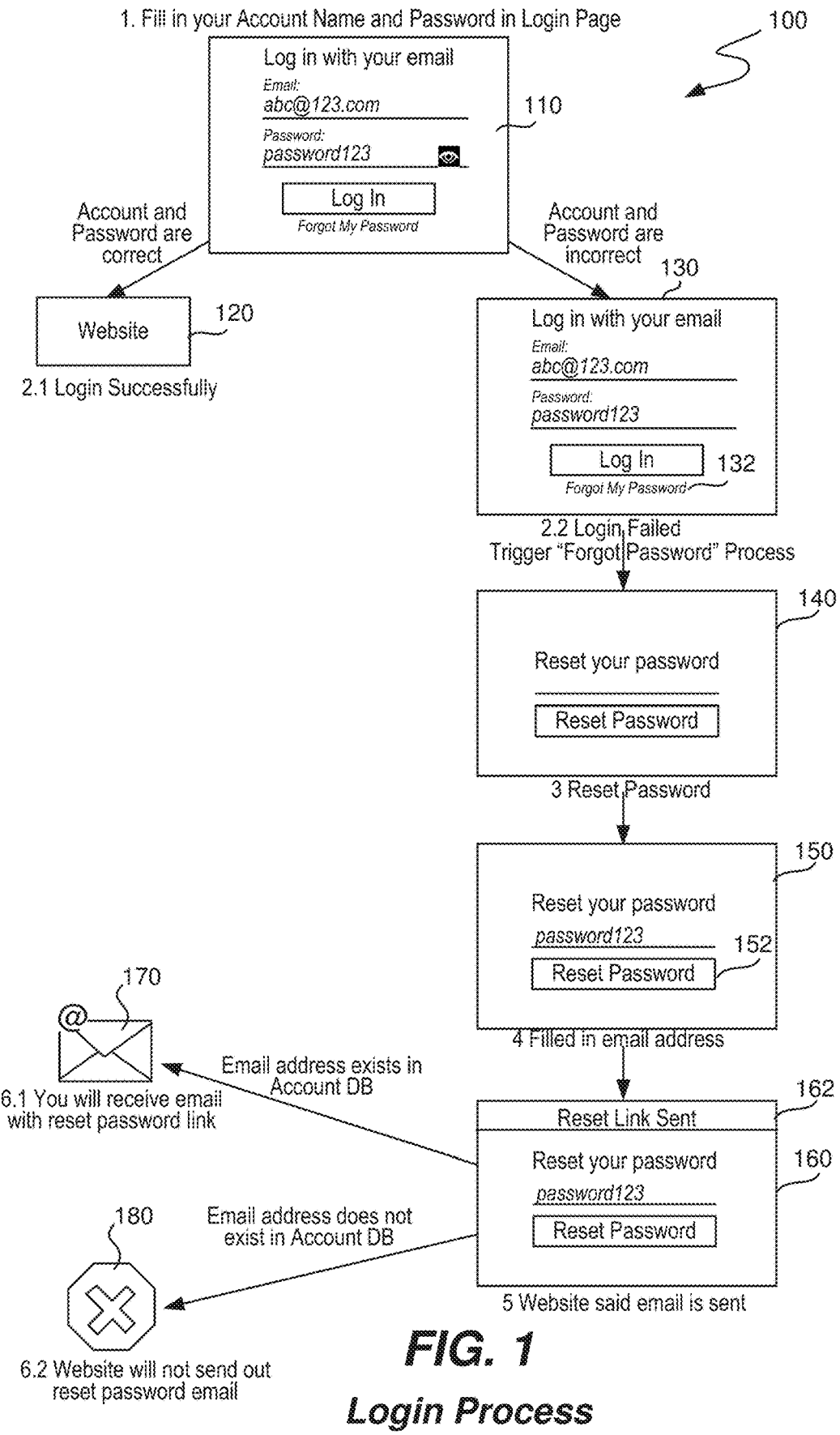
FIG. 1 is a universal login process used by mainstream, legitimate Web sites, and shows user behaviors while logging in upon a user computer.

FIG. 1 shows a universal login process 100 used by mainstream, legitimate Web sites, and shows user behaviors while logging in upon a user computer. Shown is a login window 110 (or "login request form") in which the user provides a user name, account name or other identifier (or an e-mail address used for logging in, such as test@test.com), and a password. If both are correct, login to the Web site is successful and window 120 appears, providing the user with access to the Web site.

If both are not correct (or one is incorrect), then window 130 appears telling the user that log in as failed. In addition, in order to address a failed login attempt, an authentic Web site will offer a legitimate "Forgot Password" link in order to reset a password. Shown is link 132 offering that service. As described below, a phishing Web site will also offer such a link, even though it may not function or may serve only to steal information.

Once link 132 has been clicked, window 140 appears. Here, the user needs to provide a recovery e-mail address in order to reset his or her password. The provided e-mail address must be identical to the recovery address provided during registration on the Web site. Window 150 shows that the user has entered the recovery e-mail address in the field and it provides a link 152 "Reset Password." Next, the user clicks upon link 152.

It is further realized that legitimate Web sites do not tell a user whether or not the provided e-mail address in the "reset password" process exists in an account database of the Web site for security considerations. An e-mail message containing the reset password link will be sent from the Web site to the provided recovery e-mail address only when the provided e-mail address exists in the account database. Further, for legitimate Web sites, the reset password page and the login page are hosted within the same domain.

Window 160 shows a scenario in which the provided e-mail address does exist in the account database. A message 162 informs the user "Reset Link Sent," meaning that the link has been sent to the provided e-mail address. Accordingly, the user will then receive an e-mail message 170 that contains the reset password link. Alternatively, in a scenario in which the provided e-mail address does not exist in the account database, then window 160 would indicate in some fashion that the address has not been found (or may simply provide no information), message 162 would not appear, and the Web site would not send out the reset password link in an e-mail message (shown symbolically at 180).

Thus, it is realized that phishing Web sites have no knowledge regarding correct account names, registered e-mail addresses and passwords. Therefore, it is impossible for a phishing Web site to judge if the user name and password, provided for login purposes, match one another. It is also impractical that a phishing Web site knows if the provided e-mail address for a password reset link exists or not in a database of the legitimate Web site. Nevertheless, a phishing site may mimic the flow of FIG. 1 and display the same windows that appear to be the same as the legitimate site.

Even if the legitimate Web site uses the user e-mail address as the user name (or account name) for logging in, and the phishing Web site then know the user e-mail address because it captures that during a failed login attempt, the invention still is able to detect a phishing site. In one embodiment described below, a fourth scenario, the invention can detect if the phishing site sends a fake resent link to an invalid e-mail address provided by the system. And, in another embodiment described below, a fifth scenario, the invention can detect if the domain of the reset link is different from that of the login request page.

Comparing the behavior presented by authentic Web sites and phishing Web sites, it is thus realized that a system capable of analyzing Web site behavior during a login process can effectively reduce the successful rate of phishing attempts and prevent theft of user credentials.

Figure 2:
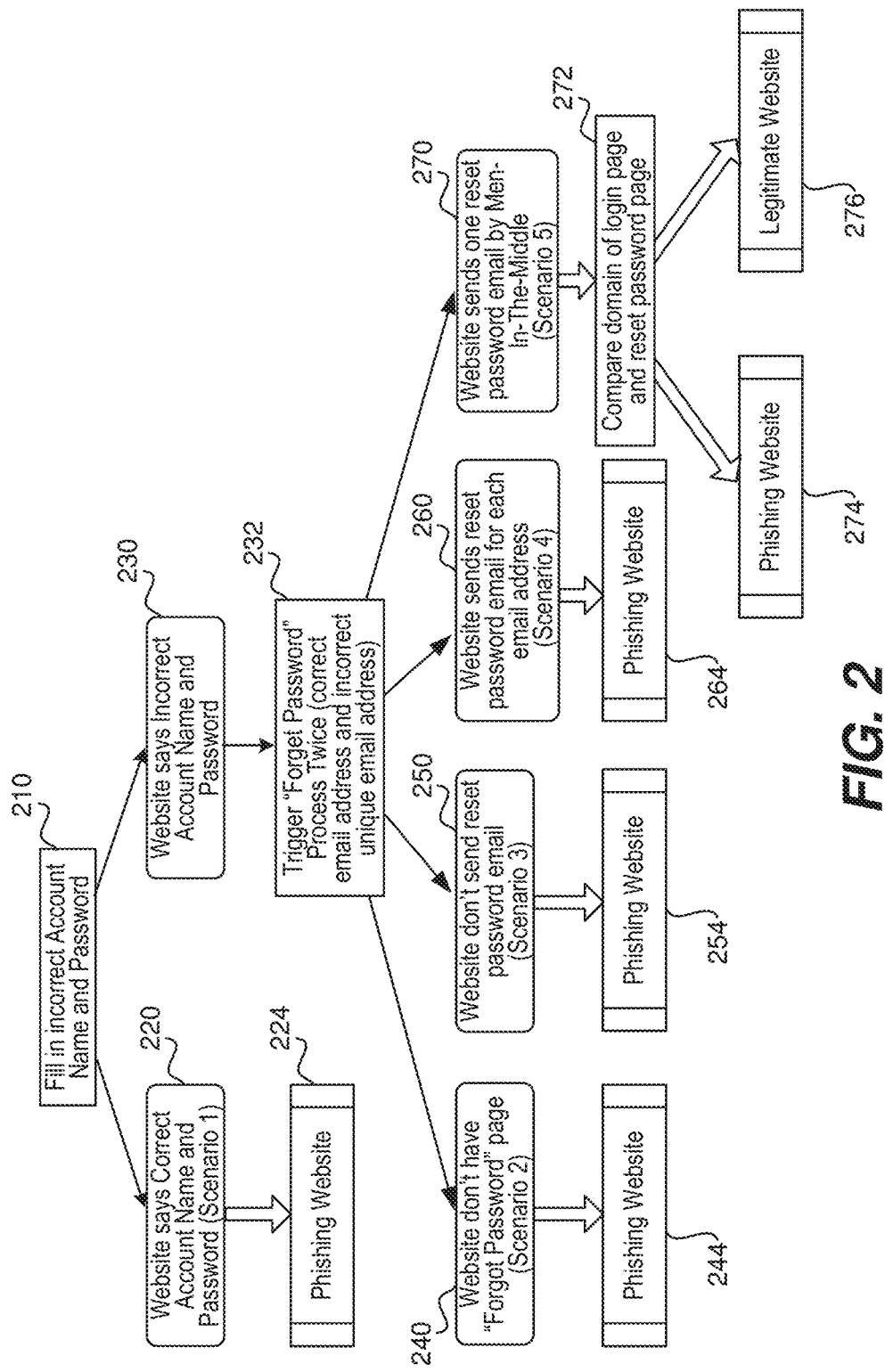
FIG. 2 is a block diagram of an overview of a system of the invention.

FIG. 2 is a block diagram of an overview of a system of the invention. Details of each of these scenarios are explained below. The system and flow as shown in FIG. 2 implement techniques to detect either legitimate or fraudulent Web sites. In a step 210, the system fills in an incorrect account name or password (or both) that are submitted to a Web site to which a user is trying to log in. In one technique, after the user fills in his or her account name and password in a browser, we replace the user's account name and password with incorrect ones using pre-installed browser plug-in software or an endpoint agent on the user computer. Next, the system then sends the login request to web site backend.

In a first scenario, Phishing Web sites only collect credentials (account name and password). The site will not respond that the submitted account name and password are incorrect but will only redirect you to a "Success" page or other page that is noncommittal.

FIGS. 3A and 3B are an example of a phishing Web site that only collect credentials. The site is "https[:]//micro-support.weebly.com" 310. Upon log in, the site requests an e-mail address 320, a user name (account name) 322, and a password 324. Once submitted, the site 340 simply displays 220 to the user a "Thank you" page 342. There is no indication that either the account name or password is incorrect. If the web site does not prompt with "incorrect account name and password," the conclusion 224 is that it is a phishing web site because a legitimate site would note the incorrect account name or password that were submitted and display that information to the user.

On the other hand, attackers may know the counterattack in the first scenario. So, a phishing web site may return "incorrect account name and password" 230 for any account name and password that are submitted.

Figure 4A:
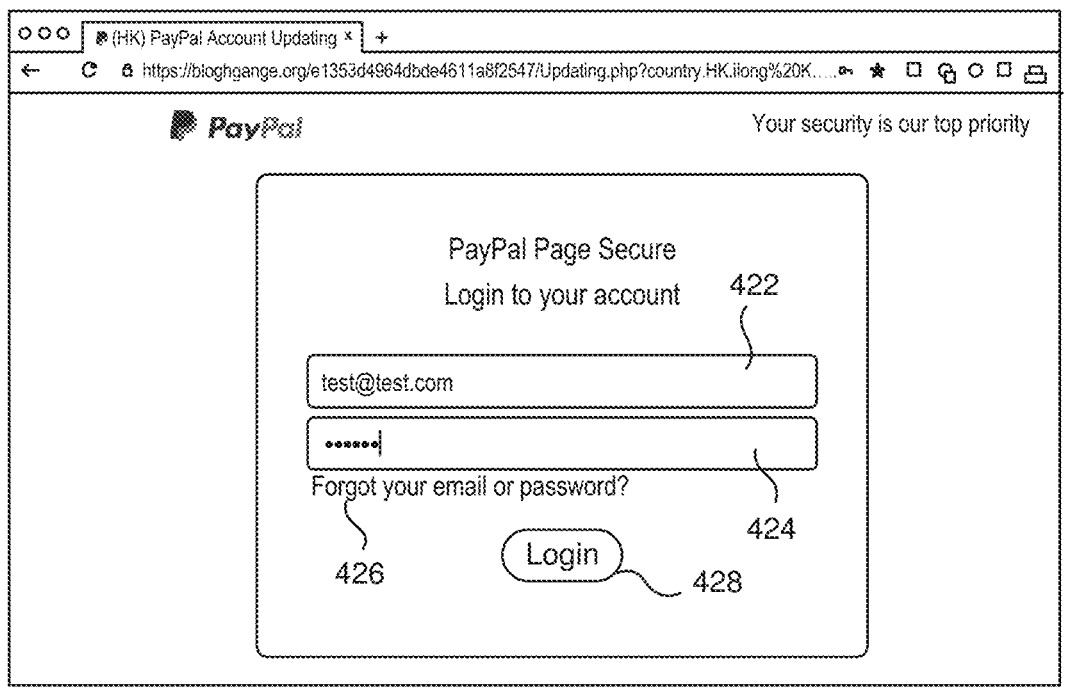
FIGS. 4A and 4B illustrate a phishing Web site that returns "User Name or Password Incorrect" for any account name and password that are submitted.
Figure 4B:
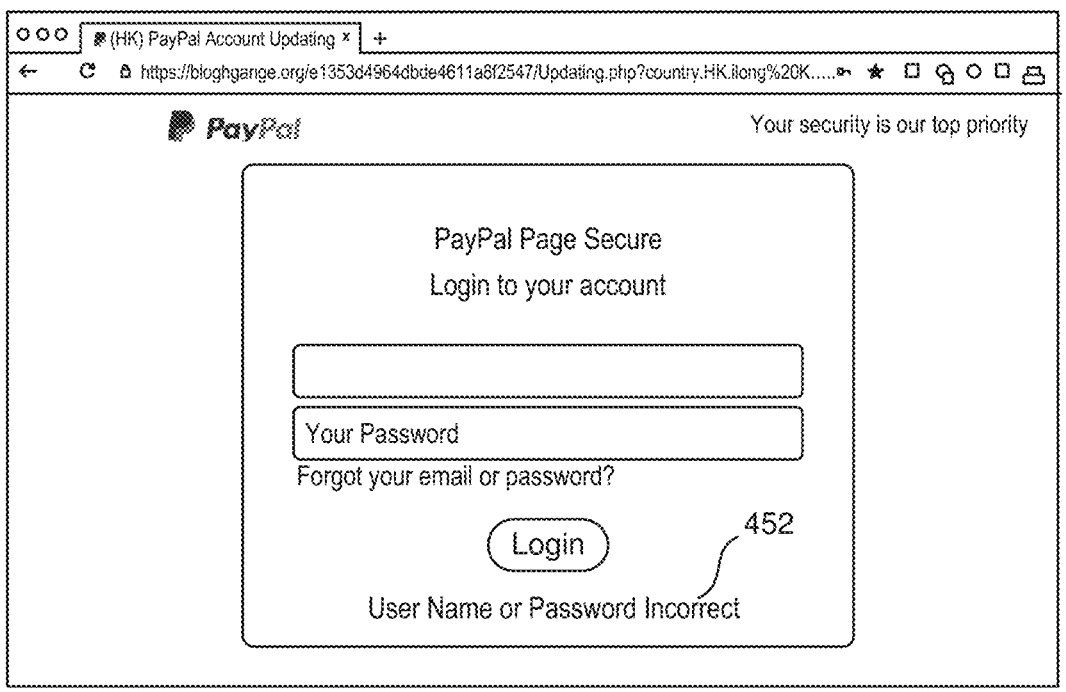

FIGS. 4A and 4B illustrate a phishing Web site that returns "User Name or Password Incorrect" for any account name and password that are submitted. Note that page 410 appears nearly the same or is exactly the same as the PayPal page that it is trying to copy, and thus fool the user. Shown on a page 410 is an input account name 422, an input password 424, a "Forgot E-mail or Password" link 426 and a submit button 428. Once submitted, the site always returns page 450 which displays "User Name or Password Incorrect" 452. For example, the site "https[:]//bloghgange.org/" is such a web site that will always show "wrong password" (or similar message) after one fills in any credentials and submits them.

In such a situation, the system triggers 232 the "Forgot Password" process twice in order to see what will happen. The first time the system uses the user's correct e-mail address (the one used to register the user on the legitimate site and which is stored in a database of the legitimate site) as the account name and the second time the system uses a one-off unique e-mail address for the account name that is not the user's correct e-mail address. The system registers a new domain and maintains an e-mail address list to make sure that each one-off e-mail address is only used once. The domain can be of any kind registered in a domain registration organization ("godaddy.com," "name.com," etc). For example, "trendfuture.com" can be registered on "godaddy.com." We can create infinite one-off unique e-mail addresses based upon a random name generator (e.g., using "https://www.samcodes.co.uk/project/markov-namegen/)."

And, such a one-off unique e-mail address is never registered in any web site. After the "Forgot Password" process is triggered twice, four other scenarios are possible, depending upon whether the Web site is a phishing Web site (and how it implements the phishing) or whether it is legitimate. In certain of the scenarios the "Forgot Password" process need only be triggered once, in fact, in the second scenario it may not be possible or necessary to trigger this process.

In a second scenario, the Phishing web site does not implement the "Forgot Password" process. For example, the site does nothing after one clicks the "Forgot your e-mail or password?" link. Or, it is possible that there is no such link. In order to implement this check, we check 240 whether the web page (the Web page that says "Incorrect User Name or Password") contains a "Forgot Password" link, and if so, then check whether "Forgot Password" link is workable or not. If the web page does not implement such a link, the conclusion 244 is that it is a phishing web site because a legitimate site would implement such a link properly.

In a third scenario, the Phishing web site does not know whether the provided e-mail address in a reset password process belongs to a valid user or not. So, it typically will not send any reset link to the e-mail address. In order to implement this check 250, we use a valid user's e-mail address to trigger the reset password process (this may be a recovery address or the address used for the account name) A legitimate web site will send the reset password message to the provided user's e-mail address because this address is stored in its database. If the user does not receive this message, the conclusion 254 is that it is a phishing web site because a legitimate site would send the reset password message to the provided user's e-mail address.

In a fourth scenario, the Phishing web site does not know whether any e-mail address provided in step 232 belongs to a valid user or not during this reset password process. So, it decides to send a fake reset password message to both e-mail addresses that are provided. To check this scenario, we use the one-off unique e-mail address mentioned above as one of the provided e-mail addresses. This address has not been registered in any legitimate web site. So, if this fake address receives 260 a reset password message from the Web site, the conclusion 264 is that it is a phishing web site because a legitimate Web site would not send the message to a fake e-mail address, only to the valid e-mail address of the user that it has in its database.

In a fifth scenario, the Phishing web site does not know whether either provided e-mail address belongs to a valid user or not in the reset password process. So, it decides to leverage the legitimate web site to handle this process. It uses a technique 270 in which it inserts itself into an exchange request and response between the user computer and the legitimate web site that the phishing site is impersonating. (This approach is similar to the so-called "Man-In-The-Middle" attack used by malware.) In other words, the phishing Web site sends both provided e-mail addresses to the legitimate site using the "Forgot Password" link of the legitimate site. Because the legitimate site only stores the user's valid address in its database (and not the one-off address), only user's valid e-mail address will receive the reset password message from the legitimate site. But, the domain of the legitimate reset password page received will be different than the phishing login page. We compare 272 both to determine if the web site is a phishing site or not.

Thus, if the domains are different, then the conclusion 274 is that it is a phishing web site because the domain of the legitimate reset password page received is different from the login page. On the other hand, if the domains are the same, then the conclusion 276 is that the site is legitimate because the domain of the legitimate reset password page received is the same as that of the login page.

Figure 5:
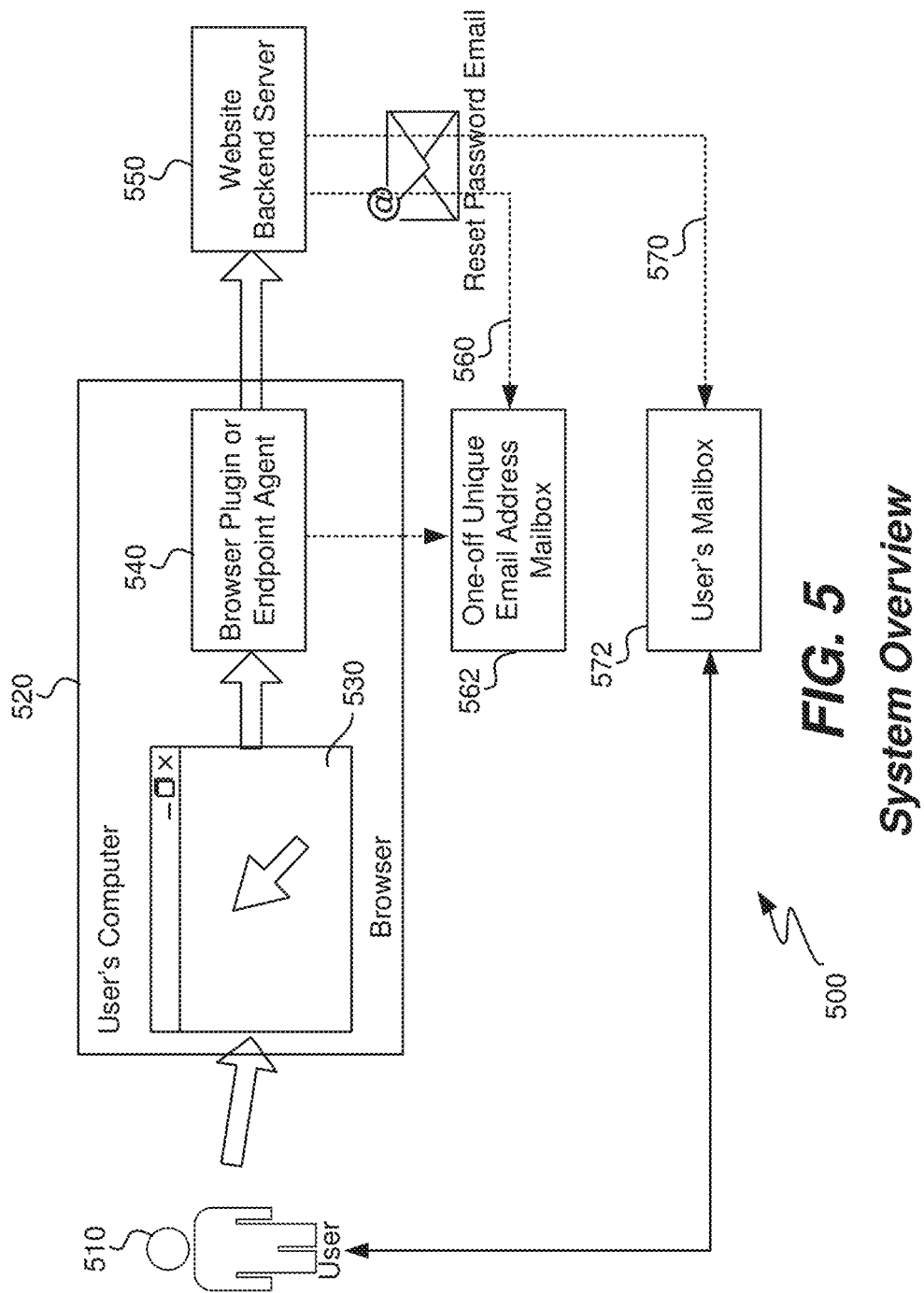
FIG. 5 illustrate an overview of the architecture of the present invention.

FIG. 5 illustrates an overview 500 of the architecture of the present invention. A user 510 interacts with his or her computer 520 in an attempt to log in to a legitimate Web site. The user uses a browser 530 which may include browser plug-in software, used to implement the above steps of FIG.

2 and those of FIG. 6 below. Alternatively, endpoint agent software on the user computer implements those steps.

The Web site is hosted on a backend server computer 550 which receives the user credentials; the system will determine whether or not the Web site is legitimate or is a phishing site. To make this determination, the system may request that the site 550 send e-mail message 560 to a one-off unique e-mail address, which may be checked at an e-mail "mailbox" 562 (such as Web mail, a mail server within a corporation, etc.) by software 540. The system may also request that the site 550 send e-mail message 570 to the user's valid e-mail address, which may be checked at the user's legitimate e-mail "mailbox" (such as Web mail, a mail server within a corporation, etc.) by the user himself.

As mentioned above, in order to implement the above, we may use either browser plug-in software or endpoint agent software 540 on the user computer. More particularly, both a browser plug-in and an endpoint agent will inspect each web page accessed by the user computer. Either is able to identify the login page by a "password" HTML tag, to replace the account name and password in that login page, and to search for and fill in the "Forgot Password" form. The browser plug-in or endpoint agent preferably operate automatically. There will be at most two steps that require the user's interaction. One, the user will fill in his or her valid e-mail address in the "Forgot Password" form in order to reset the password if his or her account name is not his or her valid e-mail address. Two, the user will fetch the reset message sent from the Web site in his valid e-mail account 572 when necessary, and will select the "reset password link" from that message in order to display a "reset password page" (such as 140). To assist, the system may provide a pop-up window to assist the user to copy the "reset password page" from the received e-mail message and to paste it into a specific input box for further comparison by the browser plug-in software or by the endpoint agent software with the original login page. Or, as described below, the user will paste the reset password link in the pop-up window.

Figure 6:
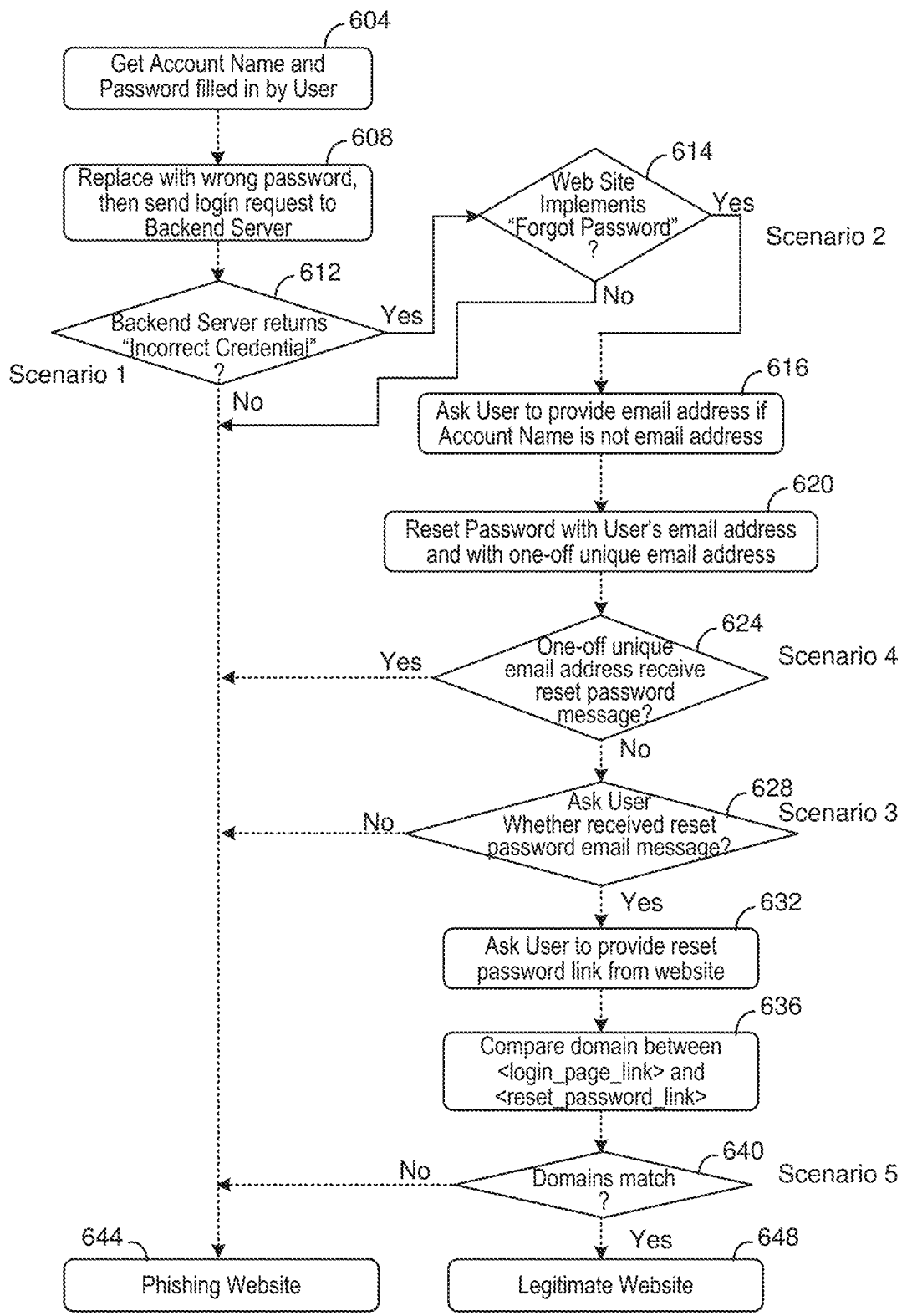
FIG. 6 is a flow diagram detailing the process used by the system.

FIG. 6 is a flow diagram detailing the process used by system 500. In a first step 604, the user accesses a desired Web site and attempts to log in by filling in his or her account name and password on a login page 110 of the Web site. He presses the "Login" button, and the account name and password filled in by the user are intercepted by the browser plug-in software or endpoint agent software 540 on the user computer. The software may intercept the name and password by using an API of the browser. For example, the browser provides an API for the plug-in to intercept any request or Web traffic (e.g., a Chrome API is: https://developer.chrome.com/extensions/webRequest).

The software 540 then replaces 608 the user's correct password with an incorrect password (that would not allow access to the user's account on the Web site), and then sends the account name and incorrect password as a login request to the backend server 550 of the Web site. At this point, it is unknown whether or not the Web site 550 is a phishing site or not. Or, one may also submit an incorrect account name with the incorrect password to trigger the reset password process. Preferably, to avoid a stolen password, one should not submit the correct password before we can confirm that it is a legitimate Web site.

In step 612, a check is performed as to whether the Web site has returned a page indicating that the credentials submitted are incorrect or not. If the site returns a page that says that the credentials are correct (or a "Login Success" page, or other indication, etc.), then under the first scenario it is concluded in step 644 that the site is a phishing Web site because if it were a legitimate site, it would have detected the incorrect credentials.

FIGS. 3A and 3B illustrate an example of a site that indicates the credentials are correct by simply replying "Thank You," and by not indicating that the credentials are incorrect.

On the other hand, if the site returns a page that says that the credentials are incorrect (or a "Login Failed" page 130, or other such indication, etc.), then no conclusion can be reached yet. FIGS. 4A and 4B illustrate a phishing site that always returns a page indicating that the credentials are incorrect. Flow continues at step 614.

Next, in step 614, the system performs a check to determine whether or not the Web site implements a "Forgot Password" link, such as link 132. The system checks whether or not the returned page contains such a link, and whether or not this link is functional or not. To perform these checks the browser plug-in inspects the HTML page and request, and parses the page to perform such a check. The endpoint agent inspects all traffic between the client computer and server, and parses the traffic to perform such a check.

If the page does not implement such a link, then under the second scenario it is concluded in step 644 that the site is a phishing Web site because if it were a legitimate site, it would implement a "Forgot Password" link.

If the page does implement such a link, then control moves to step 616 to explore scenarios 4, 3 and 5. Because the user may have logged in using a user name or account name instead of his or her valid e-mail address, in step 616 the system prompts the user to input his or her valid e-mail address (which will be used below). The system knows that the account name is not the e-mail address because an e-mail address has a special character '@' which is not allowed in a user name. Thus, the system uses '@' to check whether it is an e-mail address or not.

Figure 9:
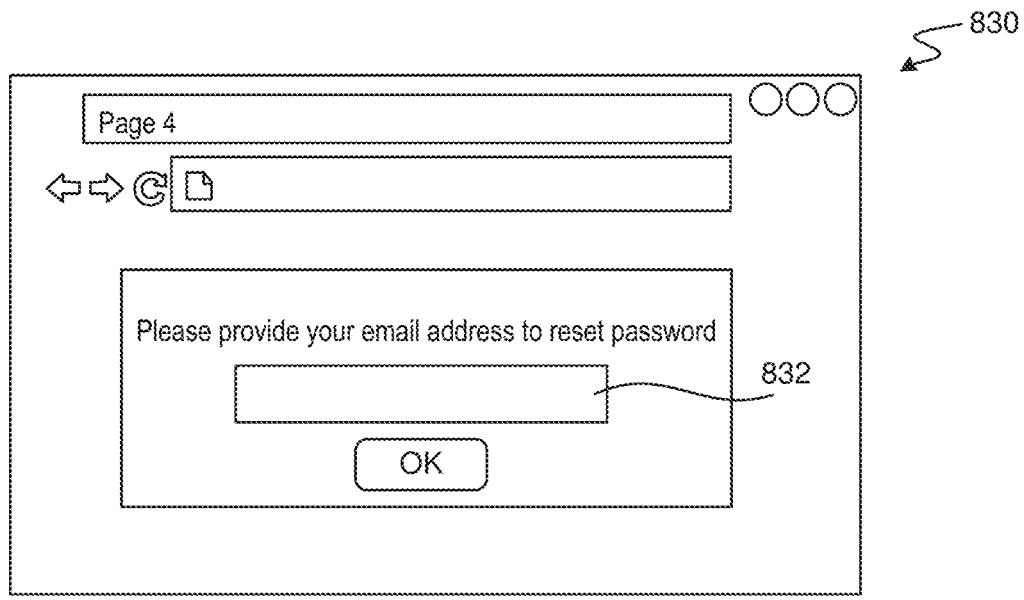
FIG. 9 illustrates a pop-up window by which a user may enter his or her e-mail address in a field in order to reset a password.

FIG. 9 illustrates a pop-up window 830 by which a user may enter his or her e-mail address in a field 832 in order to reset a password.

In step 620 the system uses both the user's valid e-mail address and a one-off unique e-mail address to reset the user's password using the "Forgot Password" link and form. For example, such a link is shown at 132 and at 426, and a form is shown at 140. The form is submitted twice, once with each e-mail address. Although the user may trigger the "Forgot Password" process himself with both e-mail addresses, preferably the browser plug-in or endpoint agent triggers the "Forgot Password" process on behalf of user using both the one-off e-mail address and valid user e-mail address.

Preferably, the one-off unique e-mail address is random, is not a valid address of the user, has not been used before with this invention, and has not been registered on any legitimate Web site. It is not registered on any legitimate Web site so that we can identify if it is from a phony Web site; in other words, if we receive a reset password e-mail message from such un-registered email address, we can conclude that it is from a phony Web site and that the Web site is likely a phishing site. And, if the address has not been used before, that increases the certainty that the site is a phishing site.

The system (via the plug-in or agent endpoint software) has access to this one-off e-mail address account so that it may check the account to see if a reset password e-mail message has arrived. By way of example, a backend system, associated with software 540 (preferably remote from computer 520), registers a new domain, and uses such domain to set up an e-mail server (having a mailbox 562), generates any number of one-off random e-mail address for checking in step 620, and delivers these e-mail addresses periodically (or as needed) to software 540. Thus. software 540 is able to check whether or not such a one-off random e-mail address account has received the reset password e-mail message. Alternatively, software 540 may perform the steps of registering a new domain, setup an e-mail server, generate the random e-mail addresses as needed, etc.

As shown in FIG. 5, a legitimate Web site 550 will send a message 570 to the user's valid e-mail address because the site is able to verify that that address is stored in its own database (from an earlier registration). Legitimate site 550 will not send message 560 to the one-off e-mail address because it does not store that address in its database. By contrast, a phishing site 550 does not know if any provided e-mail address is valid or not. In a fourth scenario, it will send a message 570 to the user's valid e-mail address and it will send message 560 to the one-off e-mail address because it assumes that each address must be valid. In a third scenario, it will not send a message 570 to the user's valid e-mail address and it will not send message 560 to the one-off e-mail address because it cannot determine which address is valid.

Next, in step 624, the system performs a check to determine whether or not the address of the one-off unique e-mail account has received the reset password message 560 at account 562. The system performs this check by using the link as shown in FIG. 5 to check mailbox 562. In other words, the system 540 has full control or knowledge of the e-mail server of the new domain and of all one-off random e-mail address accounts, so it can check whether such an account has received a reset password e-mail message.

If a message is received at account 562, this indicates that site 550 is a phishing site because a legitimate site would not send message 560, and the conclusion is phishing Web site at 644. If not, control moves to step 628. Next, in step 628, the system performs a check to determine whether or not the address of the user's valid e-mail account has received the reset password message 570 at account 572. The system performs this check by asking the user.

Figure 10:
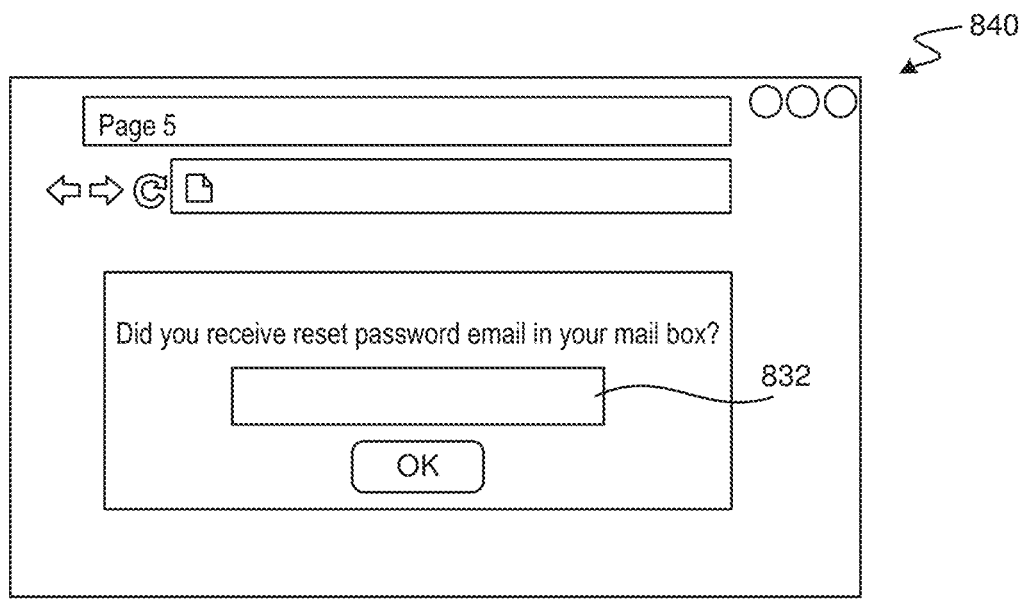
FIG. 10 illustrates a pop-up window by which the system prompts the user to input into dialog window whether or not the user has received the reset message in his or her valid e-mail account.

FIG. 10 illustrates a pop-up window 840 by which the system prompts the user to input into dialog window 842 whether or not the user has received the reset message in his or her valid e-mail account.

If a message is not received at account 572, this indicates that site 550 is a phishing site because a legitimate site would send message 570, and the conclusion is phishing Web site at 644. If a message is received, control moves to step 632.

Step 632 asks the user to provide the reset password page using the link that was sent as message 570 to the user's valid e-mail account. In other words, the user opens reset password message 570, selects the reset link, views the reset page, and copies that page. Step 636 compares the domain of the original login page from step 604 with the domain of the reset page obtained from the reset password link. If the domains do not match in step 640 then the conclusion in 644 is that site 550 is a phishing site because the domains should match. If the domains do match, then the conclusion is that the site is a legitimate Web site in step 648. Comparison of the domains may be performed in another manner as described below.

Figure 7:
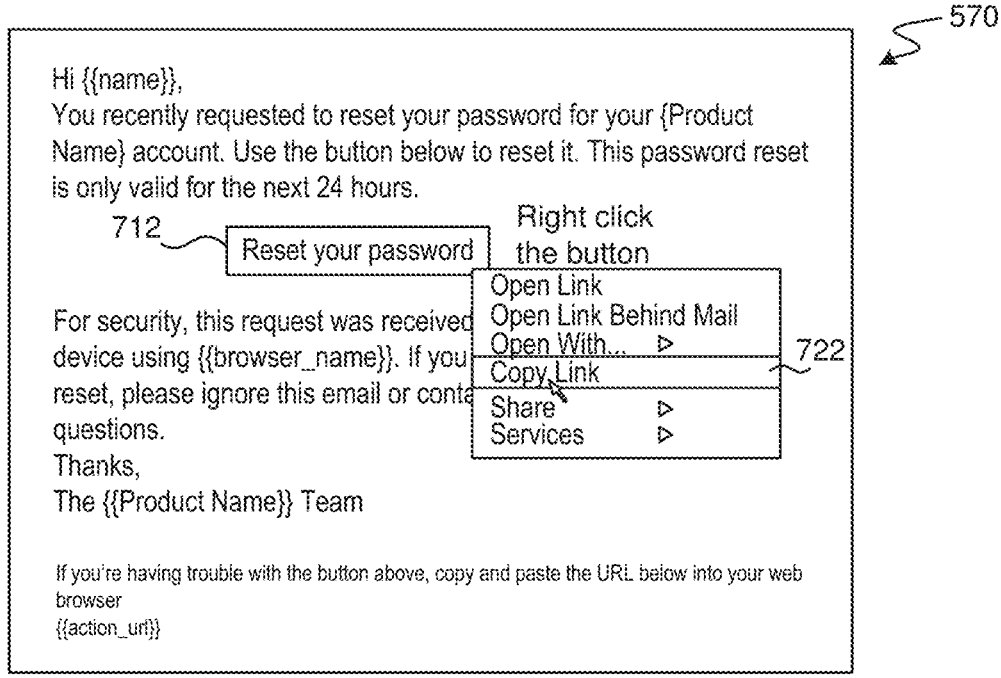
FIG. 7 illustrates a reset password message that a user may receive.

FIG. 7 illustrates a reset password message 570 that a user may receive. It includes a reset link 712 that a user may select to reset a password. Preferably, the user does not select the link as a phishing site may steal a password that the user enters. In one example, the URL of this link and its domain are: http://example.com/xxx.

Figure 8:
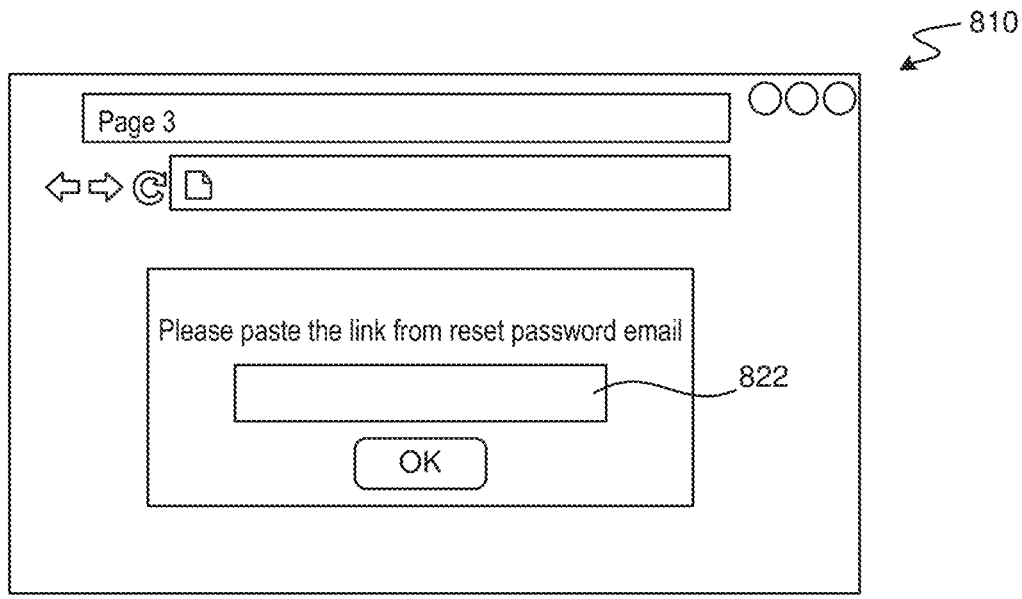
FIG. 8 illustrates a pop-up window provided by the browser plug-in software or endpoint agent software once the user indicates that the user received the reset password message.

FIG. 8 illustrates a pop-up window provided by the browser plug-in software or endpoint agent software once the user indicates that the user received the reset password message. The user is instructed to "right click" on link 712, copy the link 722, and then paste the link into the pop-up window 810 at 822. Step 636 may then be performed by the system.

In step 644 when software 540 concludes that the site is a phishing site it can take a variety of actions to alert the user, block the site, etc. For example, the software may display a warning page that will be show on the browser.

Figure 11:
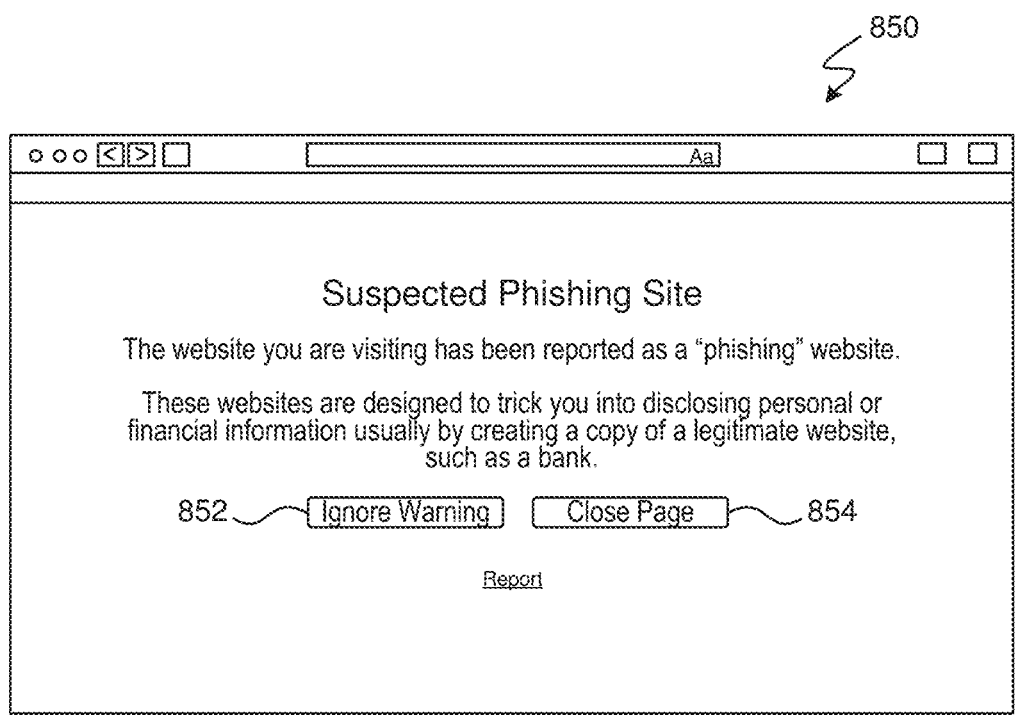
FIG. 11 illustrates a warning page displayed on the user browser when the system concludes that the site is a phishing Web site.

FIG. 11 illustrates a warning page displayed on the user browser when the system concludes that the site is a phishing Web site. The user has the option 852 of ignoring the warning and continuing to interact with the site, and submitting a valid user name and password. In this case, software 540 will not perform the steps of FIG. 6 and will allow the user to log in to the site as normal. Or, the user has option 854 in which software 540 will operate to close the Web page (as shown at 110, 310, or 410, for example) that has been determined to be sent from a phishing Web site, this protecting the user from providing a valid password to the phishing site.

In step 648 when software 540 concludes that the site is a legitimate site it can take a variety of actions such as displaying a window in the browser indicating that the site is not a phishing site, or similar. Or, the software may simply do nothing and allow the user to interact with the Web site, in which case the user submits a valid user name and password and software 540 will not perform the steps of FIG. 6 and will allow the user to log in to the site as normal.

Additional Embodiments

The invention includes these additional embodiments.

A1. In a user computer, a method of detecting a phishing Web site, said method comprising:

receiving a login request form from a browser of said user computer having an account name and a password that is destined for a Web site;

replacing said account name or said password of said login request form with a respective incorrect account name or incorrect password;

sending said login request form from said user computer to said Web site over a network connection; and in response to said sending, receiving a Web page from said Web site and determining that said Web page does not indicate that said incorrect account name or said incorrect password is incorrect; and alerting a user of said user computer that said Web site is a phishing Web site.

A2. A method as recited in claim A1 further comprising:

receiving said login request form at said browser without said account name and said password from said Web site.

A3. A method as recited in claim A1 further comprising:

determining that said Web page from said Web site indicates that both said incorrect account name and said incorrect password are correct.

A4. A method as recited in claim A1 further comprising:

replacing said account name with said incorrect account name and replacing said password with said incorrect password in said login form.

A5. A method as recited in claim A1 further comprising:
receiving, at said user computer, said account name and said password via an input from said user.

A6. A method as recited in claim A1 further comprising:
closing a Web page from said Web site that is displayed on said browser.

B1. In a user computer, a method of detecting a phishing Web site, said method comprising:
receiving a login request form from a browser of said user computer having an account name and a password that is destined for a Web site;
sending said login request form from said user computer to said Web site over a network connection;
in response to said sending, receiving a Web page from said Web site and determining that said Web page indicates that either said account name or said password is incorrect;
determining that said Web page does not implement any mechanism to reset said account name or said password; and
alerting a user of said user computer that said Web site is a phishing Web site.

B2. A method as recited in claim B1 further comprising:
determining that said Web page does not implement any mechanism by determining that said Web page does not include any link to reset said account name or said password.

B3. A method as recited in claim B1 further comprising:
determining that said Web page does not implement any mechanism by determining that a link on said Web page to reset said account name or said password does not function.

B4. A method as recited in claim B1 further comprising:
replacing said account name or said password of said login request form with a respective incorrect account name or an incorrect password before said sending said login request form.

B5. A method as recited in claim B1 further comprising:
selecting a link on said Web page to reset said account name or said password and determining that said selection does not function.

B6. A method as recited in claim B1 further comprising:
closing a Web page from said Web site that is displayed on said browser.

Computer System Embodiment

Figure 12A:
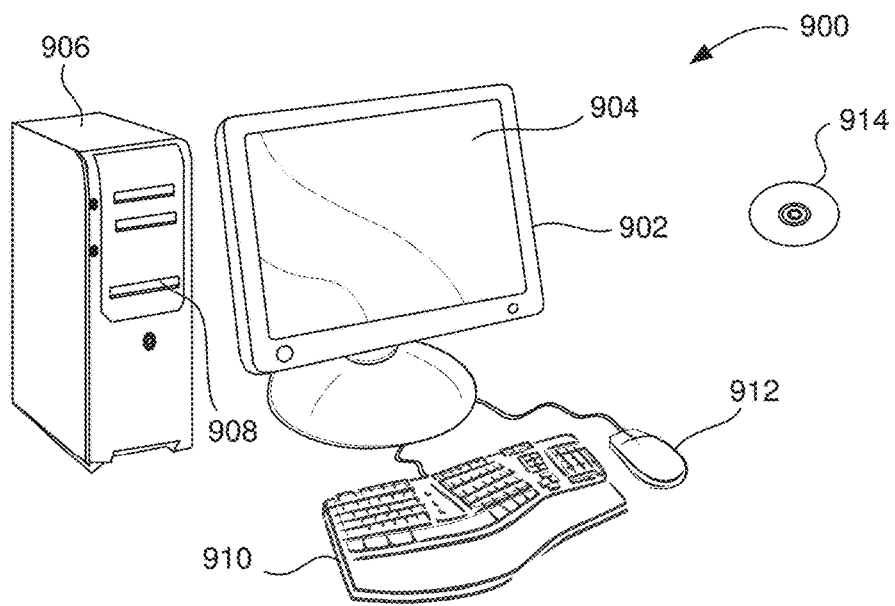
FIGS. 12A and 12B illustrate a computer system suitable for implementing embodiments of the present invention.
Figure 12B:
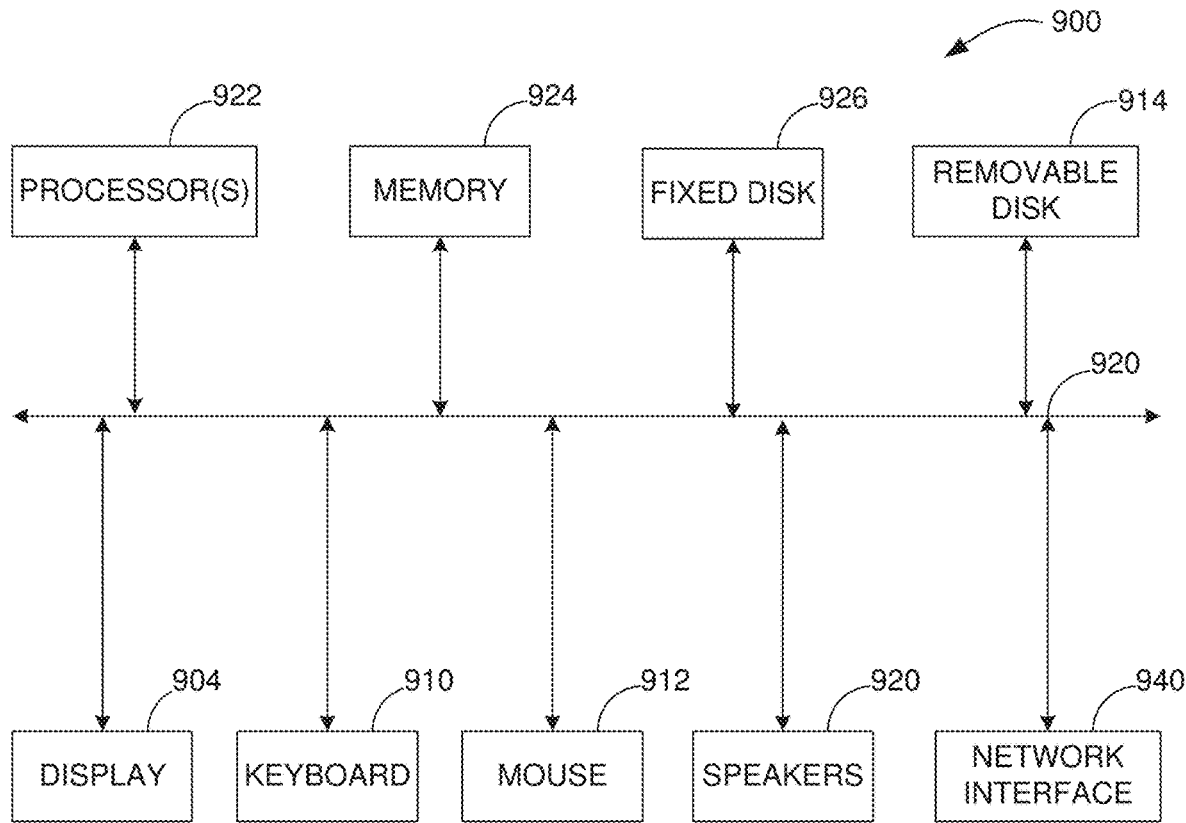

FIGS. 12A and 12B illustrate a computer system 900 suitable for implementing embodiments of the present invention. FIG. 12A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 12B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:
1. In a user computer, a method of detecting a phishing Web site, said method comprising:
receiving a Web page from a Web site over a network connection indicating that either an account name or a password of a login request form received from said user computer is incorrect, said Web page including a reset link to reset said account or said password;
using said reset link, sending a valid e-mail address of said user to said Web site;

after said sending, receiving an input from said user indicating that no message to reset said account name or said password has been received at said valid e-mail address; and alerting said user of said user computer that said Web site is a phishing Web site.

2. A method as recited in claim 1 further comprising:

displaying, on said user computer, a window requesting that said user indicate whether or not a message to reset said account name or said password has been received at said valid e-mail address.

3. A method as recited in claim 1 further comprising:

using said reset link, sending an invalid e-mail address of said user to said Web site.

4. A method as recited in claim 3 wherein said invalid e-mail address has not been provided before to said Web site.

5. A method as recited in claim 1 wherein said Web site appears the same as a legitimate Web site, said method further comprising:

said user registering said valid e-mail address with said legitimate Web site prior to said receiving a Web page from said Web site.

6. A method as recited in claim 1 further comprising:

closing said Web page from said Web site that is displayed on said browser.

7. In a user computer, a method of detecting a phishing Web site, said method comprising:

receiving a Web page from a Web site over a network connection indicating that either an account name or a password of a login request form received from said user computer is incorrect, said Web page including a reset link to reset said account or said password;

using said reset link, sending an invalid e-mail address of said user to said Web site;

after said sending, determining that a message to reset said account name or said password has been received at said invalid e-mail address; and alerting said user of said user computer that said Web site is a phishing Web site.

8. A method as recited in claim 7 further comprising:

determining that a message to reset said account name or said password has been received at said invalid e-mail address by checking for a reset link in said message in said e-mail account of said invalid e-mail address.

9. A method as recited in claim 7 further comprising:

using said reset link, sending a valid e-mail address of said user to said Web site.

10. A method as recited in claim 7 wherein said invalid e-mail address has not been provided before to said Web site.

11. A method as recited in claim 9 wherein said Website appears the same as a legitimate Web site, said method further comprising:

said user registering said valid e-mail address with said legitimate Web site prior to said receiving a Web page from said Web site.

12. A method as recited in claim 7 further comprising:

closing said Web page from said Web site that is displayed on said browser.

13. In a user computer, a method of detecting a phishing Web site, said method comprising:

receiving a Web page from a Web site over a network connection indicating that either an account name or a password of a login request form received from said user computer is incorrect, said Web page including a link to input an e-mail address in order to reset said account or said password;

using said link, sending a valid e-mail address of said user to said Web site;

after said sending, determining that a reset message with a reset link to reset said account name or said password has been received at said valid e-mail address;

determining that said reset link in said reset message includes a domain that does not match a domain of said login request form; and alerting said user of said user computer that said Web site is a phishing Web site.

14. A method as recited in claim 13 further comprising:

displaying, on said user computer, a request that said user paste said reset link in a window or paste a reset page obtained via said reset link in said window in order to obtain said domain of said reset link.

15. A method as recited in claim 13 further comprising:

using said reset link, sending an invalid e-mail address of said user to said Web site.

16. A method as recited in claim 15 wherein said invalid e-mail address has not been provided before to said Web site.

17. A method as recited in claim 13 wherein said Web site appears the same as a legitimate Web site, said method further comprising:

said user registering said valid e-mail address with said legitimate Web site prior to said receiving a Web page from said Web site.

18. A method as recited in claim 13 further comprising:

closing said Web page from said Web site that is displayed on said browser.

\* \* \* \* \*